United States Patent
Miya

[11] Patent Number: 6,128,288
[45] Date of Patent: Oct. 3, 2000

[54] CDMA CELLULAR RADIO TRANSMISSION SYSTEM

[75] Inventor: Kazuyuki Miya, Kawasaki, Japan

[73] Assignee: Matsushita Electric Industrial Co., Ltd., Osaka, Japan

[21] Appl. No.: 08/990,533

[22] Filed: Dec. 15, 1997

[30] Foreign Application Priority Data

Dec. 26, 1996 [JP] Japan .................................. 8-356456

[51] Int. Cl.[7] .................................................. H04B 7/216

[52] U.S. Cl. ........................................... 370/335; 370/342

[58] Field of Search ..................................... 370/335, 342, 370/320, 441, 479; 375/205, 208, 209, 210

[56] References Cited

U.S. PATENT DOCUMENTS

| | | | |
|---|---|---|---|
| 5,103,459 | 4/1992 | Gilhousen et al. | 375/150 |
| 5,345,469 | 9/1994 | Fulghum . | |
| 5,402,413 | 3/1995 | Dixon . | |
| 5,699,380 | 12/1997 | Sugita | 375/208 |
| 5,949,816 | 9/1999 | Okamoto | 375/208 |
| 6,018,667 | 1/2000 | Ghosh et al. | 455/502 |

FOREIGN PATENT DOCUMENTS

| | | |
|---|---|---|
| 7222232 | 8/1995 | Japan . |
| 9602987 | 2/1996 | WIPO . |

OTHER PUBLICATIONS

European Search Report dated Nov. 2, 1998.
Kakinuma et al., "Autonomous Frequency–Selection and Interference–Detection Algorithm for Underlaid Micro/Pico Cell System," IEICE Conference, 1995, p. 379.
Umeda et al., "Channel Code Allocations for D S–CDMA Mobile Radios," IEICE Conference, 1995, p. 426.

*Primary Examiner*—Chi H. Pham
*Assistant Examiner*—Brenda H. Pham
*Attorney, Agent, or Firm*—Stevens, Davis, Miller & Mosher, L.L.P.

[57] ABSTRACT

In a radio communication system capable of autonomously determining, at new installation thereof, a spreading code to be used by its own station, a CDMA base station facility includes a storage unit for storing therein all candidates of spreading codes available to base stations of the system, a base station signal receiving unit for receiving signals sent from its neighboring base stations, a correlation value calculating unit for calculating correlation values between the received signals from the neighboring base stations and the spreading codes stored in the storage unit, a comparing means for comparing the calculated correlation values with each other, and a spreading code selecting means for selecting, in accordance with a result of the comparison, a kind and/or a phase of spreading code to be used by the own station. When installed at a new place, the facility receives signals from its neighboring base stations and autonomously selects spreading codes and/or phases of spreading code not used in its periphery to set a spreading code of the own station.

20 Claims, 13 Drawing Sheets

CDMA CELLULAR RADIO TRANSMISSION SYSTEM

BACKGROUND OF THE INVENTION

1. Field of the Invention

The present invention relates to a base station facility conducting a cellular mobile communication using a code division multiple access (CDMA) operation, and in particular, to a base station facility capable of autonomously determining a spreading code to be used for identification of a base station associated therewith when the base station is first installed.

2. Description of the Related Art

In a mobile communication employing the CDMA operation, the spectrum of information signals are spread into a band sufficiently broader than an inherent information band width thereof in accordance with a spreading code for transmission thereof to thereby conduct a spectrum spread communication. The spreading codes are assigned to users to achieve multiple accesses, namely, code division multiple accesses (CDMA).

Moreover, in a cellular mobile communication system adopting the CDMA operation, a spreading code is set to each base station as an identification code thereof such that a mobile station receives, via a shared control channel, information transmitted from the base stations using the respective spreading codes to identify one of the spreading codes for which the highest correlation output is attained, and resultantly recognizes a cell to which the mobile station belongs.

Additionally, there has been considered code allocation in which a long code is set to each base station and a short code is assigned to each user such that a spreading code is created by multiplying the short code by the long code. Reference is to be made to the "Channel Code Allocations for DS-CDMA Mobile Radios", Umeda et al., 1995 IEICE Conference B-426.

In the CDMA cellular mobile communication system, it is possible to repeatedly use the same frequency in all cells. However, when assigning spreading codes to be set to the respective base stations, the code assignment is required to guarantee that the base stations are appropriately identified.

For this purpose, when a new base station BS7 is to be installed as shown in FIG. 10, some of the spreading codes which are not used by adjacent base stations BS1 to BS6 and which are available to the base station BS7 are selected as candidates. One of the candidates being used by a base station BSi, which is installed apart from the base station BS7 and of which a received field level is fully low at the installation place of B27, is set as the spreading code thereof.

However, in the conventional CDMA cellular mobile communication system, a manager of the system designs assignment of stations to determine the spreading code for each base station. Therefore, each time a new base station is installed, a large amount of manpower and a long period of time are required to determine a spreading code for the pertinent base station.

On the other hand, "Autonomous Frequency-Selection and Interference-Detection Algorithm for Underlaid Micro/Pico Cell System", Kakinuma et al., 1995 IEICE Conference B-379 discloses an algorithm for selecting a transmitting frequency to be used for a small base station on the basis of signal-level measurement in mobile stations and the base station. Further, in accordance with the JP-A-7-222232, there has been described a radio channel allocating method in which the call loss probability as well as the chance of occurrences of interference are not deteriorated even when any change takes place in a radio propagation apparatus is due to, for example, installation of a new radio base station in accordance with an autonomous distributive allocation method. In this method, each radio channel is assigned with a priority level. Namely, there is obtained a weight which changes in association with results of allocatability or assignability decision for the radio channel in the past. Specifically, the weight alters in relation to the number of assignability decisions in the past relative to the decision of assignability at the current point of time. Channel assignability is determined for the radio channels in a descending order of priority levels assigned thereto. In the article, there has been described a method of determining assignability of a radio channel in which a received level or a ratio between a desired wave and an interference wave is measured in the pertinent channel such that the channel is to be allocated when the measured value is equal to or more than a threshold value. However, the correlation of the spreading code is essential in the CDMA operation and the allocation determining method above does not necessarily lead to an optimal state to receive signals.

SUMMARY OF THE INVENTION

It is therefore an object of the present invention to provide a CDMA base station facility in which when a new station is installed, a spreading code used by the station can be autonomously determined, thereby solving the problem of the prior art.

To achieve the object, in accordance with the present invention, there is provided a CDMA base station facility for use in a communication system including storage means for storing therein all candidates of spreading codes which can be used by base stations in the system, base station signal receiving means for receiving signals transmitted from neighboring base stations, correlation value calculating means for calculating correlation values between received signals from the neighboring base stations and the spreading codes stored in the storage means, comparing means for comparing the calculated correlation values with each other, and spreading code selecting means for selecting a kind and/or a phase of a spreading code to be used by the base station in accordance with a result of the comparison.

When installed in a new location, the CDMA base station facility receives signals from neighboring base stations thereof and autonomously selects a spreading code and/or a phase of the code not used in the periphery thereof to select a spreading code for the own station. Consequently, it is unnecessary for the system manager to design allocation or assignment of base stations at installation thereof.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
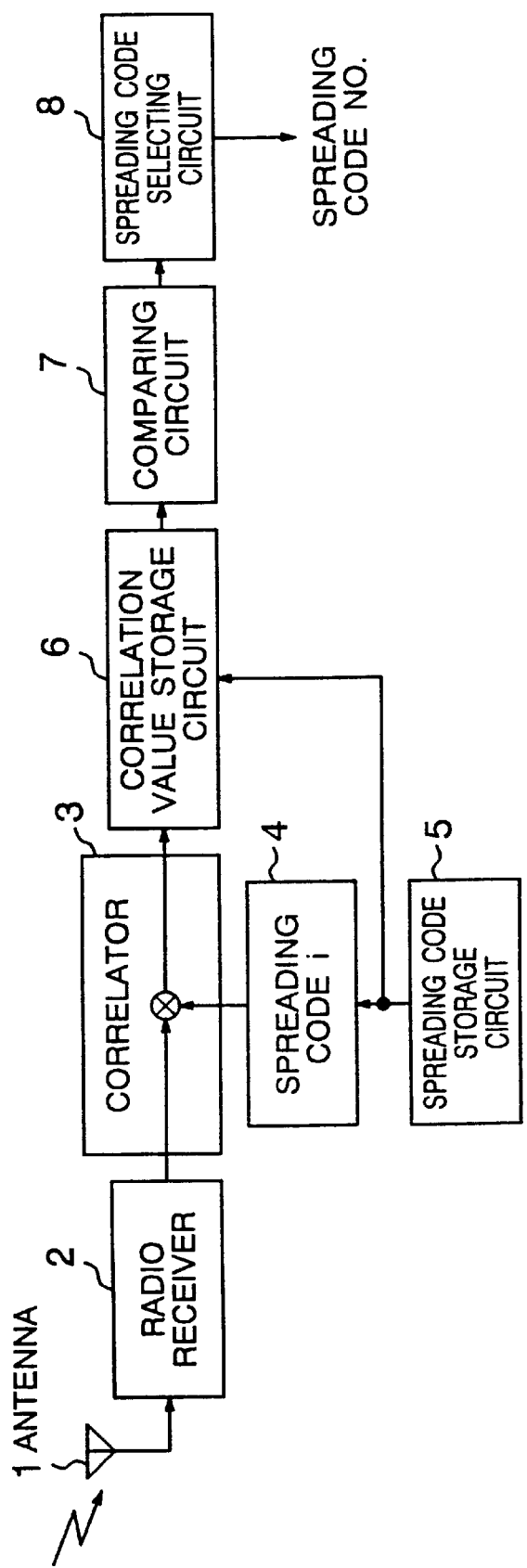
FIG. 1 is a block diagram showing the configuration of a CDMA base station facility in a first embodiment according to the present invention.

Referring now to the drawings, description will be given of an embodiment a CDMA base station facility in accordance with the present invention.

(First embodiment)

A CDMA base station facility of the first embodiment is configured to autonomously determine a spreading code to be used by the own station. As shown in FIG. 1, the facility includes an antenna 1 for signal reception, a radio receiver 2 for receiving transmission signals sent from neighboring base stations, a spreading code storage circuit 5 for storing therein all candidates for spreading codes available to the base stations of the system, a correlation circuit 3 for calculating correlation values between a spreading code i 4 read from the storage circuit 5 and the received signals, a correlation value storage circuit 6 for storing therein a magnitude of each correlation value calculated by the correlation circuit 3, a comparator circuit 7 for comparing the stored magnitudes of correlation values with each other, and a spreading code selecting circuit 8 for selecting a spreading code in accordance with a result of the comparison.

When installed as a new station, the base station facility configured as above receives signals transmitted from its neighboring base stations via common control channels.

The received signal is down-converted by the receiving section 2 and then correlation values are calculated by the correlation circuit 3 between the signal and mutually different kinds of spreading codes i obtained from the storage circuit 5. The correlation values attained by the circuit 3 are stored in the correlation value storage circuit 6, the values being related to code numbers of spreading codes i. The comparing circuit 7 compares magnitudes of the stored correlation values with each other and the spreading code selecting circuit 8 selects numbers assigned to spreading codes having a correlation value equal to or less than a predetermined value and then outputs the numbers therefrom.

The base station thereafter sets the selected number as the spreading code of the own station to communicate with mobile stations.

Figure 2:
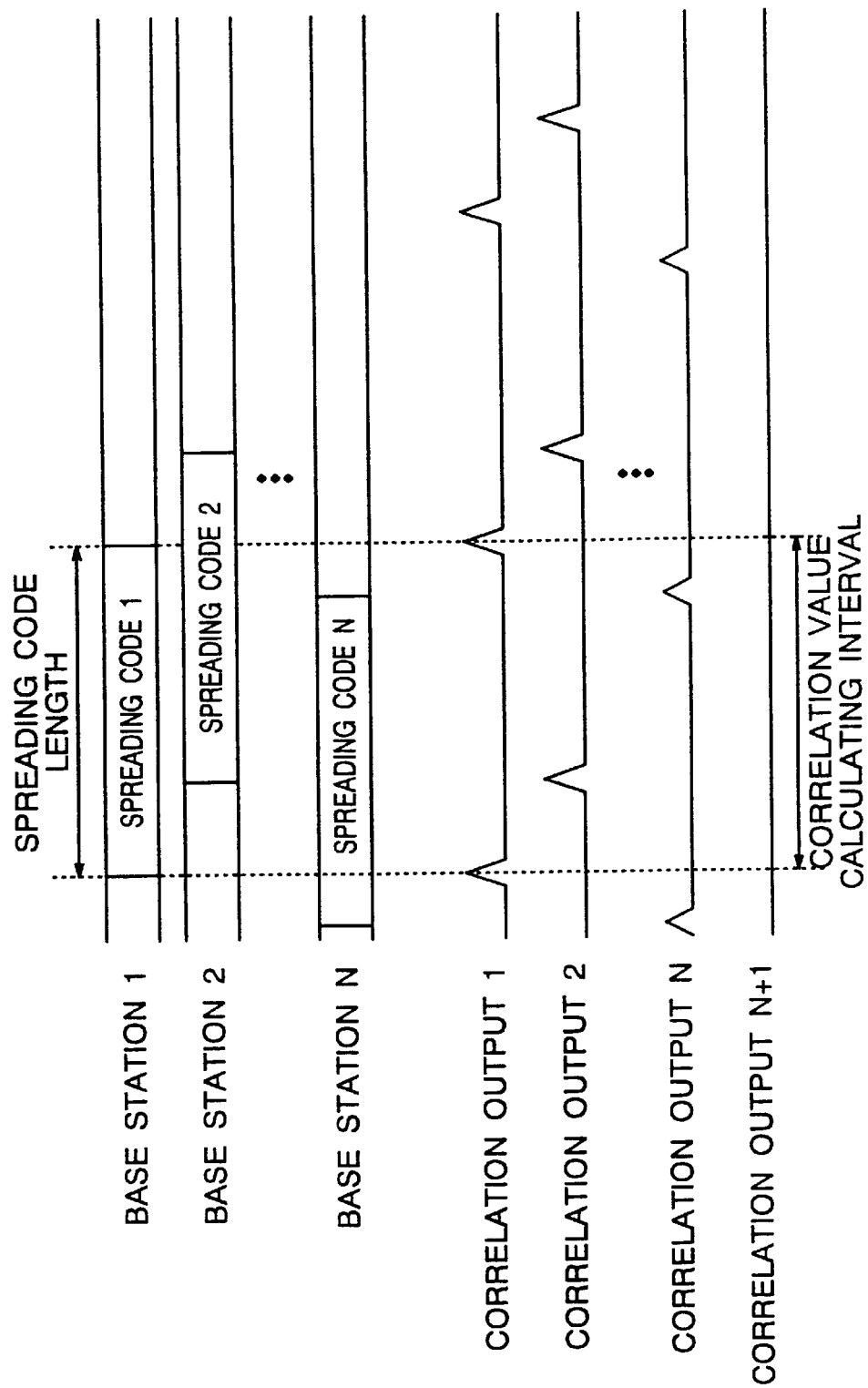
FIG. 2 is a timing chart of the CDMA base station facility in the first embodiment to calculate correlation outputs in a system in which base stations operate in an asynchronous fashion.

FIG. 2 shows timing to determine a spreading code when a base station, installed as a new station in a system in which the base stations asynchronously conduct communication, receives signals from neighboring base stations thereof. In this system, the base stations 1, 2, and N respectively use a spreading code 1, a spreading code 2, and a spreading code N.

Assume that when the new base station calculates correlation values between the received signal and the spreading codes 1, 2, N, and N+1, there are outputted a correlation output 1, a largest correlation output 2, a small correlation output, and a correlation output of 0, respectively.

The new base station calculates correlation values in accordance with all spreading codes available to the system. The base station then compares the calculated correlation values with each other in an interval equivalent to the spreading code length and selects therefrom a spreading code N+1 corresponding to a correlation value having the smallest magnitude to determine the spreading code N+1 as the objective spreading code of the own station.

Figure 3:
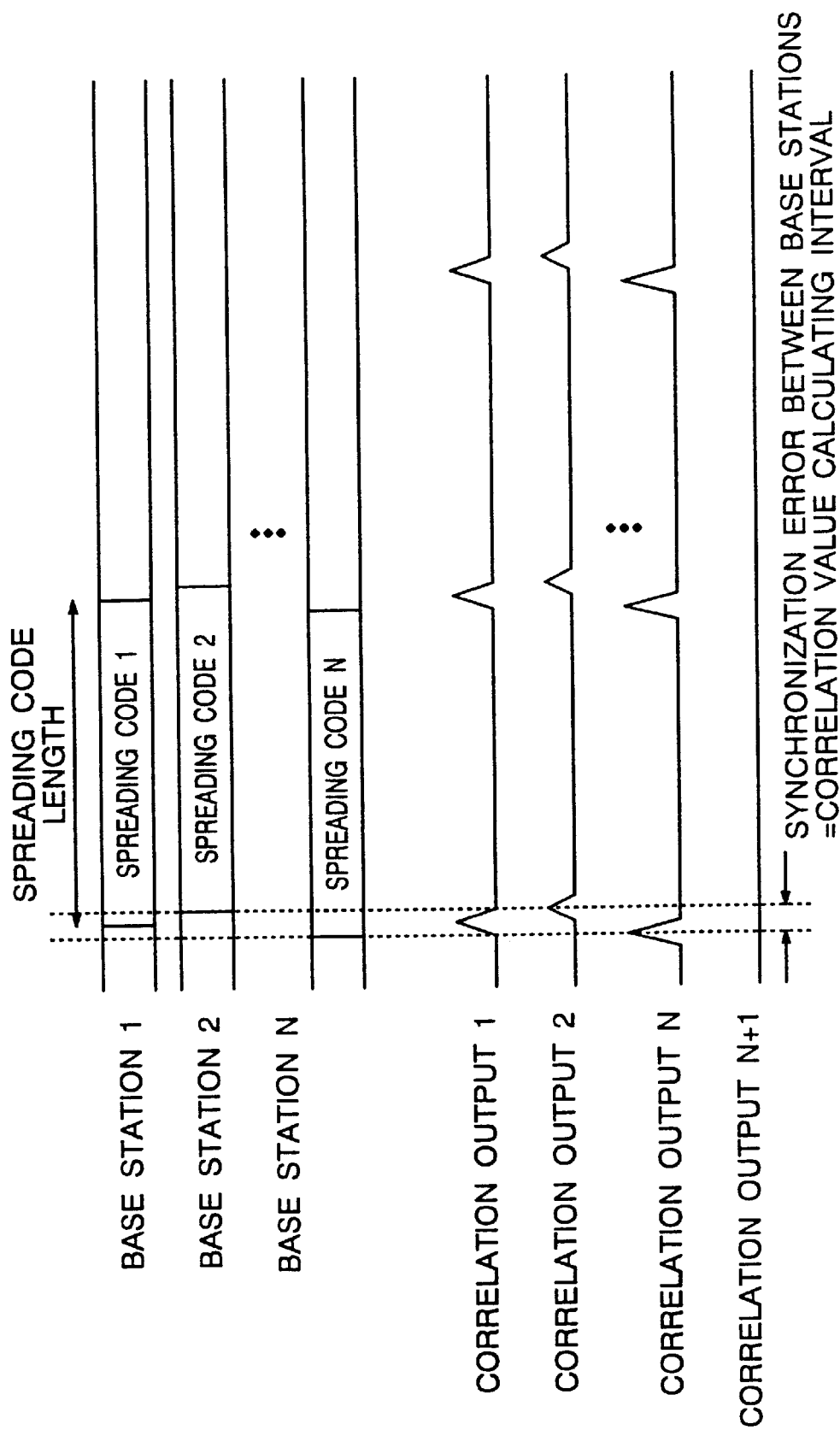
FIG. 3 is a timing chart of the CDMA base station facility in the first embodiment to calculate correlation outputs in a system in which base stations operate in a synchronous fashion.

FIG. 3 shows timing to determine a spreading code when a base station, installed as a new station in a system in which the base stations are synchronized with each other, receives signals from its neighboring base stations. In this system, since the respective base stations synchronously communicate with each other, a new base station installed therein can determine a spreading code thereof by comparing calculated correlation values in an interval (associated with a synchronization error between base stations) in which the synchronization is disturbed between the base stations.

In this manner, the base station facility can autonomously determine the spreading code to be used by the own station without requiring any help of the system manager.

(Second embodiment)

For the second embodiment, description will be given of a configuration in which a spreading code is autonomously set in the CDMA base station facility and a configuration in which signals are received from a mobile station in accordance with the spreading code set as above.

Figure 4:
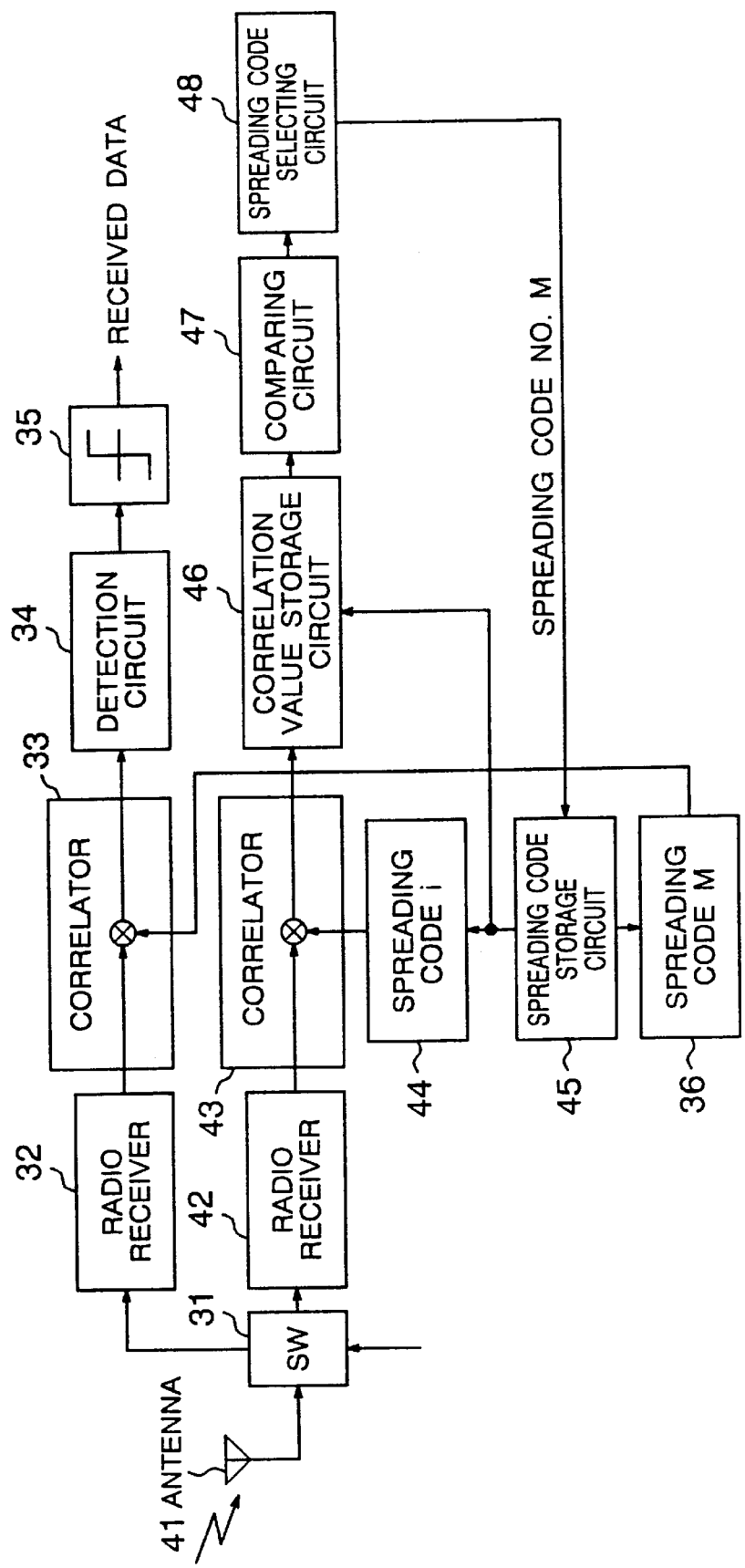
FIG. 4 is a block diagram showing the configuration of a CDMA base station facility in a second embodiment according to the present invention.

Like the first embodiment shown in FIG. 1, the base station facility includes, as a system to autonomously determine a spreading code as shown in FIG. 4, a radio receiver 42 for receiving signals transmitted from its neighboring base stations, a spreading code storage circuit 45 for storing therein all candidates of spreading codes available to the base stations of the system, a correlation circuit 43 for calculating correlation values between spreading codes i 44 and the received signals, a correlation value storage circuit 46 for storing therein magnitudes of correlation values calculated by the correlation circuit 43, a comparing circuit 47 for comparing the stored magnitudes of correlation values with each other, and a spreading code selecting circuit 48 for selecting a spreading code M in accordance with a result of the comparison. Furthermore, the facility includes, as a system for receiving a signal from a mobile station, a radio receiver 32 for receiving a transmission signal sent from a mobile station, a correlation circuit 33 for calculating a correlation value between the received signal and the selected spreading code M 36, a detection circuit 34 for demodulating the received signal, and a binary decision circuit 35 for conducting a binary decision for a result of the demodulation to decode the signal into received data. Moreover, the facility includes an antenna 41 for receiving signals and a switch 31 for conducting a change-over operation between the output destinations of the received signal in response to a switching signal.

When initially installed, the base station facility conducts a change-over operation of the switch 31 to output the received signal to the radio receiver 42. When a signal sent from a neighboring base station is received via a shared control channel by the antenna 41, the system including the radio receiver 42, the correlation circuit 43, the spreading code storage circuit 45, the correlation value storage circuit 46, the comparing circuit 47, and the spreading code selecting circuit 48 accomplishes the operation for the received signal as described in conjunction with the first embodiment to thereby select a spreading code assigned with number M having a small magnitude of correlation value.

After the spreading code M is selected, the facility sends a switching signal to the switch 31 to output the received signal to the radio receiver 32. Resultantly, the transmission signal sent from the mobile station is received by the antenna 41 to be delivered to the section 32.

The radio receiver 32 down-converts the frequency of the received signal and then the correlation circuit 33 calculates a correlation value between the received signal and the spreading code M. The detection circuit 34 demodulates the received signal and the binary decision circuit 35 conducts a binary decision for the received signal to thereby decode the signal into received data.

As discussed above, when a signal transmitted from a neighboring base station is received and a spreading code to be used by the own station is determined, the base station facility conducts a change-over operation of the switch to rapidly starts communication with mobile stations.

(Third embodiment)

Figure 11:
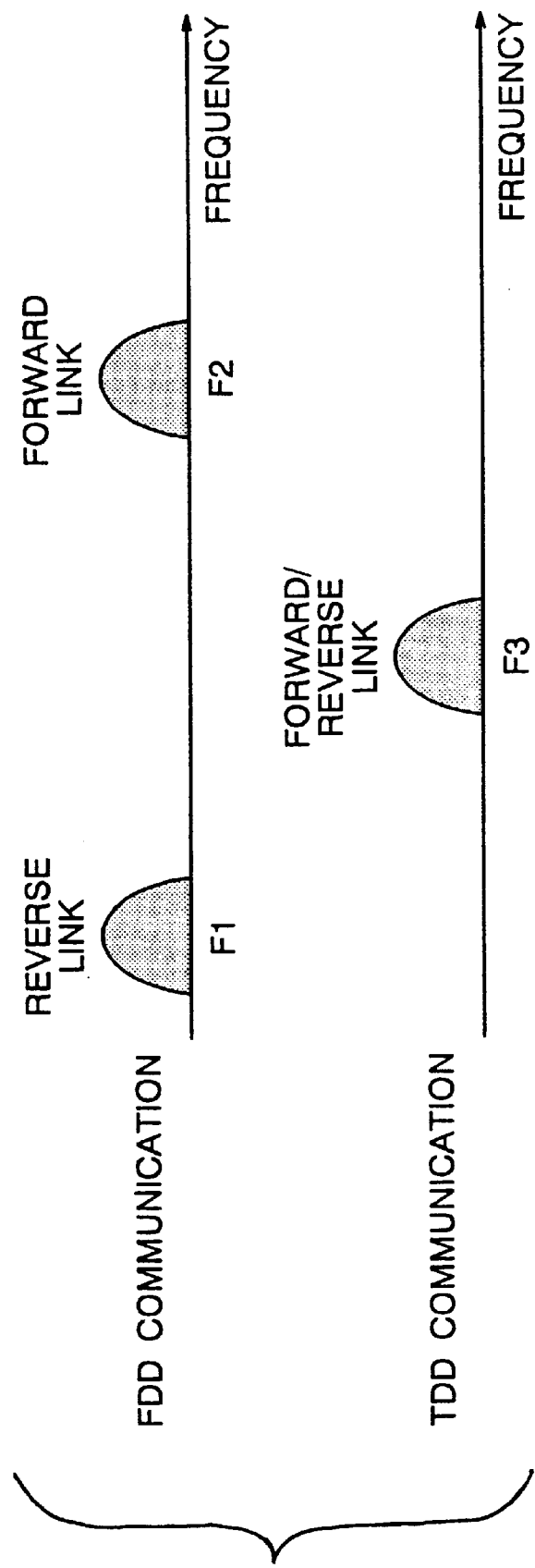
FIG. 11 is a diagram for explaining the FDD and TDD communications.

In the third embodiment, there is configured a CDMA/TDD (TDD: Time Division Duplex) base station facility. As shown in FIG. 11, the signal transmission and reception are conducted at mutually different points of timing with the same frequency in the TDD method.

Figure 5:
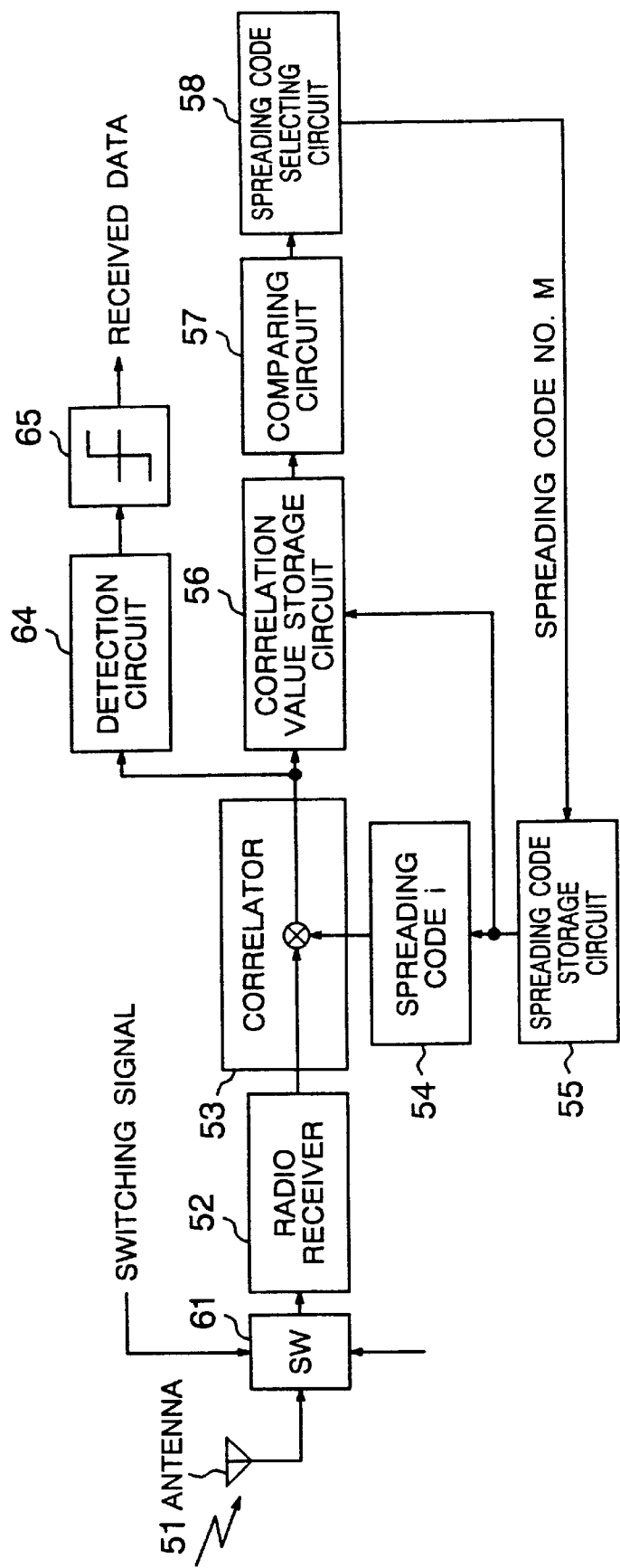
FIG. 5 is a block diagram showing the configuration of a CDMA base station facility in a third embodiment according to the present invention.

As shown in FIG. 5, the facility includes an antenna 51, a switch 61 for conducting a change-over operation between the points of on and off timing in response to a switching signal, a radio receiver 52 for receiving transmission signals from neighboring base station and mobile stations, a spreading code storage circuit 55 for storing therein all candidates of spreading codes available to the base stations of the system, a correlation circuit 53 for calculating correlation values between the received signals and spreading codes i 54 read from the storage circuit 55 or a spreading code M selected for the own station, a correlation value storage circuit 56 for storing therein magnitudes of correlation values calculated by the correlator 53, a comparing circuit 57 for comparing the stored magnitudes of correlation values with each other, a spreading code selecting circuit 58 for selecting a spreading code M in accordance with a result of the comparison, a detection circuit 64 for demodulating a received signal from a mobile station, and a binary decision circuit 65 for conducting a binary decision for a result of the demodulation to decode the signal into received data.

Figure 6:
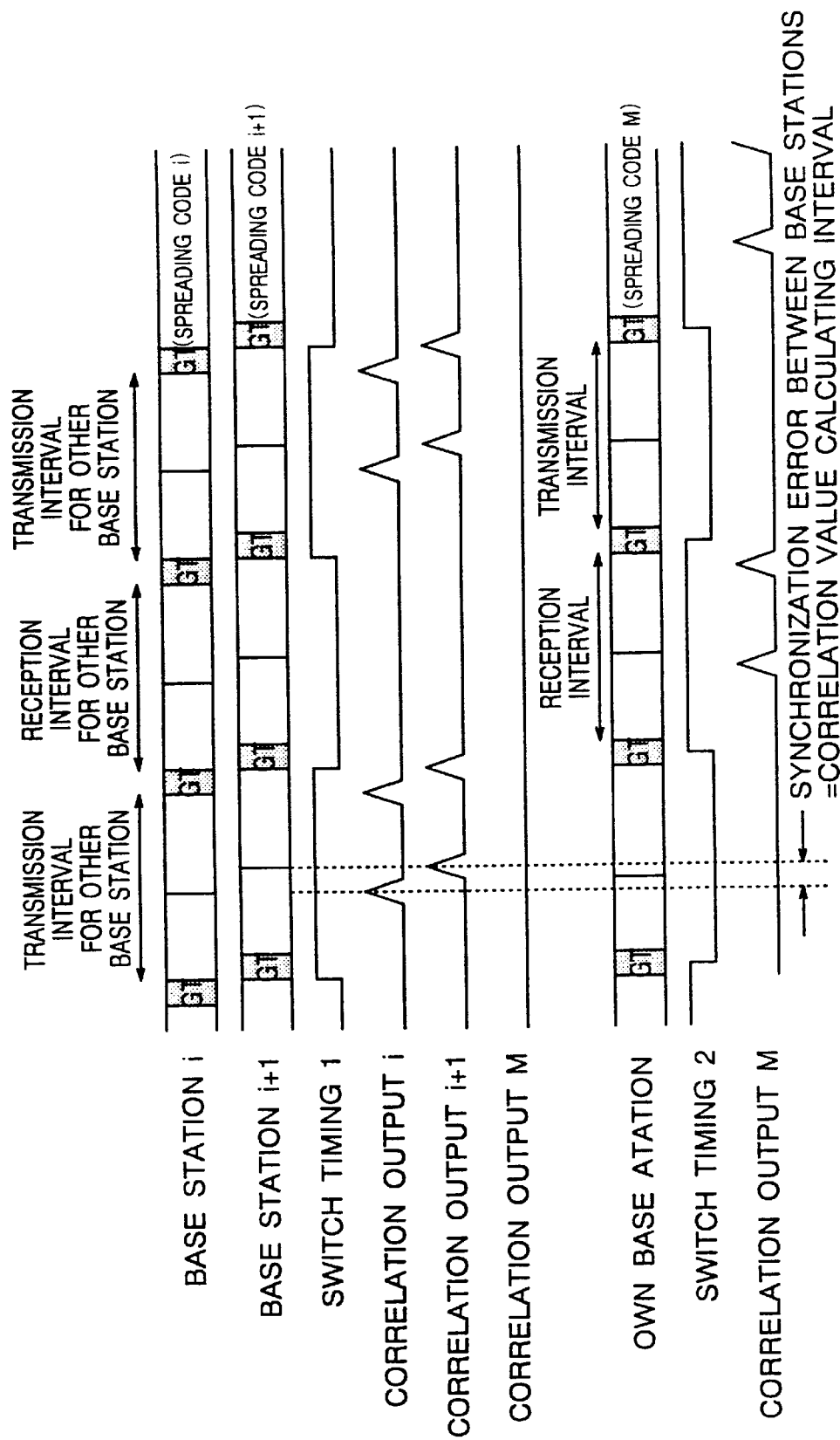
FIG. 6 is a timing chart of the CDMA base station facility in the third embodiment to calculate correlation outputs in a system in which base stations operate in a synchronous fashion.

FIG. 6 shows points of change-over timing of the switch 61 in the CDMA/TDD system in which the base stations are synchronized with each other. A neighboring base station i sends to mobile stations a signal obtained by spreading the received signal in accordance with a spreading code i during a transmission interval or period for other base station and receives signals from mobile stations during a reception interval for the base station following the transmission interval for other base station with an interval of guard time (GT) therebetween to demodulate the received signal through a de-spreading operation with a spreading code i. In this situation, it is assumed that the spreading or de-spreading operation is repeatedly conducted twice by using the spreading code i during the transmission and reception intervals.

In the neighboring base station i+1, the spreading operation of the transmission signal and the de-spreading operation of the received signal are also conducted with the spreading code i+1 substantially at the same time.

A new base station installed (i.e., own base station) turns the switch 61 on and off at a switching point of timing 1 such that the switch 61 is on only during the transmission interval for other base station. Consequently, a signal sent from a neighboring base station during the transmission interval for other base station is received by the antenna 51. For the signal, a circuit group including the radio receiver 52, the correlation circuit 53, the spreading code storage circuit 55, the correlation value storage circuit 56, the comparing circuit 57, and the spreading code selecting circuit 58 carries out the operation described in conjunction with the first embodiment to thereby select a spreading code having a small magnitude of correlation value.

After selecting the spreading code M, the new base station sends a switching signal to the switch 61 to change the on/off timing to a change-over timing 2. Therefore, a signal sent from a mobile station during the reception interval is received via the antenna 51.

The radio receiver 52 down-converts the frequency of the received signal and then the correlation circuit 54 calculates a correlation value between the received signal and the selected spreading code M. The detection circuit 64 demodulates the received signal and the binary decision circuit 65 conducts a binary decision to thereby decode the signal into received data.

In the CDMA/TDD base station facility described above, the radio receiver and the correlation circuit can be used in a shared fashion when the spreading code is set to the own station and when a signal is received from a mobile station. This consequently results in simplification of the facility.

(Fourth embodiment)

For the fourth embodiment, description will be given of a configuration in which a spreading code is autonomously set in the CDMA base station facility using the FDD (Frequency Division Duplex) method and a configuration in which signals are transmitted to a mobile station in accordance with the spreading code set as above. In the FDD method, a frequency F1 of a reverse link to send signals from a base station to a mobile station is different from a frequency F2 of a forward link to send signals from the mobile station to the base station as shown in FIG. 11.

Figure 7:
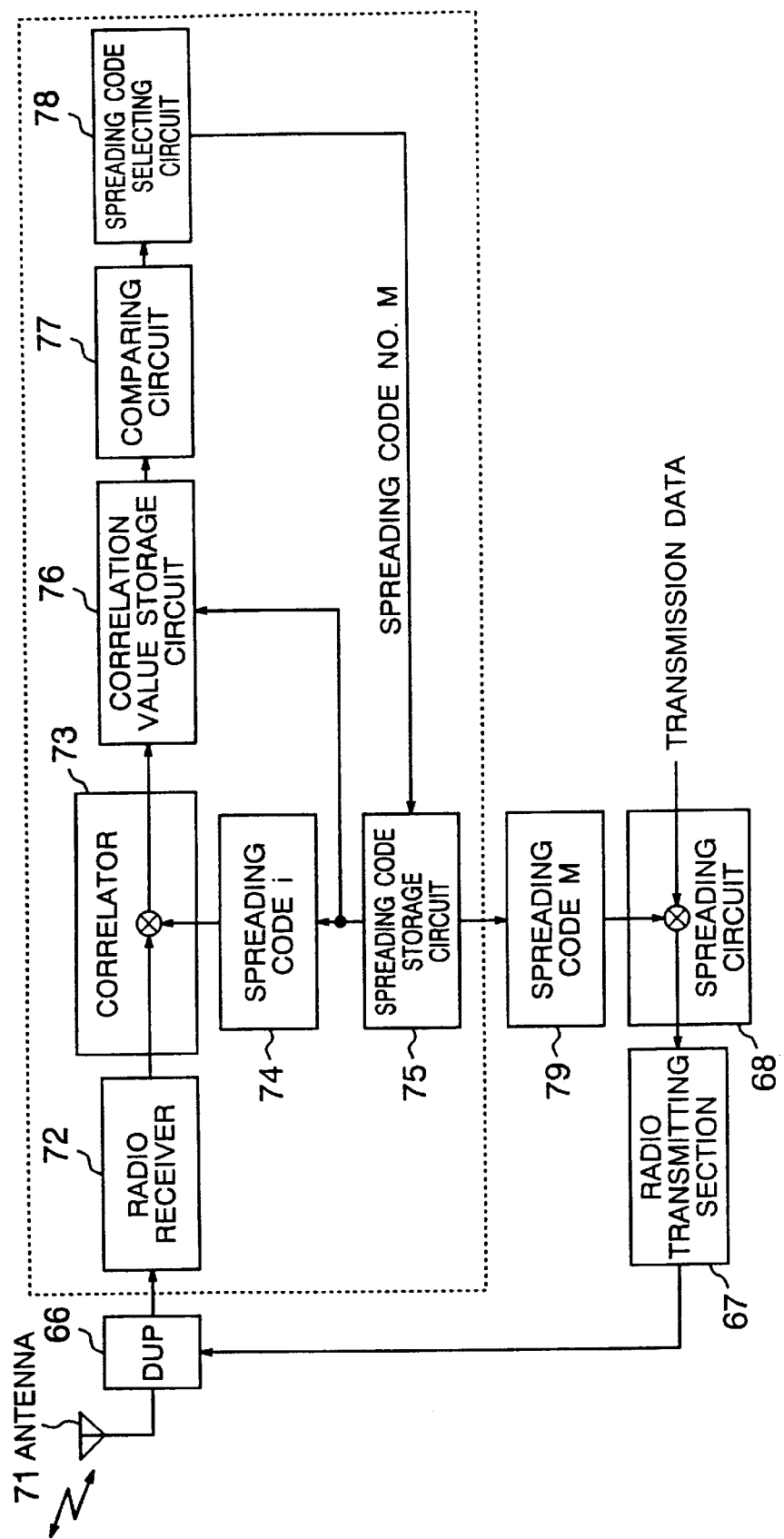
FIG. 7 is a block diagram showing the configuration of a CDMA base station facility in a fourth embodiment according to the present invention.

Like the first embodiment of FIG. 1, the base station facility includes, as a system for autonomously determining a spreading code as shown in FIG. 7, a radio receiver 72, a spreading code storage circuit 75, a correlation circuit 73, a correlation value storage circuit 76, a comparing circuit 77, and a spreading code selecting circuit 78 which are enclosed with dotted lines. Furthermore, the facility includes, as a system for transmitting a signal to a mobile station in accordance with the determined spreading code, a spreading circuit 68 for spreading transmission data in accordance with a determined spreading code M 79 and a radio transmitting section 67 for up-converting the transmission signal into a signal having a radio frequency of F1. Additionally, the facility includes an antenna 41 for signal transmission and reception and a shared unit 66 to deliver the transmission and received signals to mutually different routes.

In the base station facility, there is conducted a setting operation such that the radio receiver receives a signal of frequency Fl on the reverse link. Therefore, a signal transmitted from a neighboring base station to a shared control channel is received via the antenna 71 and the shared unit 66 by the radio receiver 72. The system including the section 72, the spreading code storage circuit 75, the correlation circuit 73, the correlation value storage circuit 76, the comparing circuit 77, and the spreading code selecting circuit 78 accomplishes the operation for the received signal as described in conjunction with the first embodiment to thereby select a spreading code assigned with number M having a small magnitude of correlation value.

In the facility in which the spreading code M has been selected, the spreading circuit 68 spreads the transmission data and then the radio transmission section 67 up-converts the frequency of the signal into the frequency F1 of the reverse link. The signal outputted from the section 67 is transmitted via the shared unit 66 and the antenna 71.

As above, in the base station facility, when a signal is received from a neighboring base station and a spreading code to be used by the own station is determined, it is possible to immediately conduct transmission of signals in accordance with the spreading code.

(Fifth embodiment)

In conjunction with the fifth embodiment, description will be given of a configuration in which a spreading code is autonomously set in the CDMA base station facility utilizing the FDD method and a configuration in which signals are transmitted to and received from a mobile station in accordance with the spreading code set as above.

Figure 8:
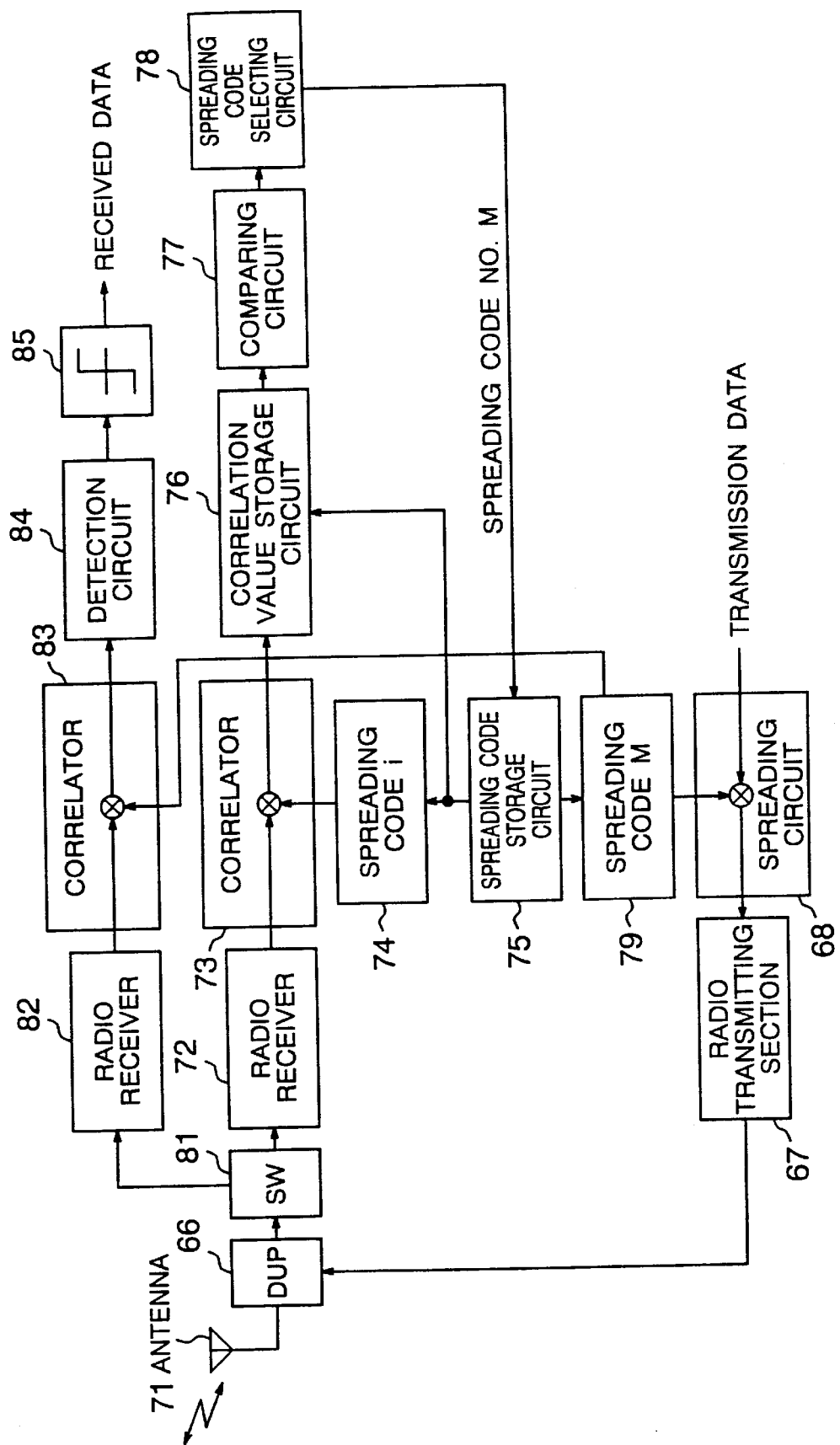
FIG. 8 is a block diagram showing the configuration of a CDMA base station facility in a fifth embodiment according to the present invention.

As shown in FIG. 8, the facility includes, in addition to the configuration of the fourth embodiment of FIG. 7, a switch 81 for conducting a change-over operation between output destinations of the received signal, a radio receiver 82 for receiving signals of the frequency F2 on the forward link, a correlation circuit 83 for calculating correlation values between the received signals and a selected spreading codes M 79, a detection circuit 84 for demodulating the received signals, and a binary decision circuit 85 for conducting a binary decision for a result of the demodulation to decode the signals into received data.

In an initial stage of installation, the base station facility conducts a change-over operation of the switch 81 such that the received signal is outputted to the radio receiver 72.

A signal sent from a neighboring base station onto a reverse link is inputted via the antenna 71, the shared unit 66, and the switch 81 to the radio receiver 72, which then down-converts the frequency of the received signal. A circuit group including the correlation circuit 73, the spreading code storage circuit 75, the correlation value storage circuit 76, the comparing circuit 77, and the spreading code selecting circuit 78 achieves an operation for the received signal as described in conjunction with the first embodiment and thereby selects one of the spreading codes which is assigned with a number M having a small magnitude of correlation value.

When the spreading code M is thus selected, the facility sends a switching signal to the switch 81 to output the received signal to the radio reception section 82.

Transmission data to a mobile station is spread by the spreading circuit 68 in accordance with the spreading code M 79 to be up-converted by the radio transmitting section 67 into a signal having the frequency F1 of the reverse link. The signal is then sent via the shared unit 66 and the antenna 71.

On the other hand, the signal sent from the mobile station to the forward link is inputted via the antenna 71, the shared unit 66, and the switch 81 to the receiving section 82, which then down-converts the received signal into a signal having a frequency F2. The correlation circuit 83 calculates a correlation value between the received signal and the spreading code M. The detection circuit 84 demodulates the received signal and the binary decision circuit 85 carries out a binary decision for a result of the demodulation to decode the signal into received data.

As discussed above, when a signal from a neighboring base station is received and a spreading code to be used by the own station is determined, the base station facility conducts a change-over operation of the switch to immediately start signal transmission and reception with the mobile station.

(Sixth embodiment)

For the sixth embodiment, description will be given of a configuration in which a spreading code is autonomously set in the CDMA base station facility adopting the TDD method and a configuration in which signals are transmitted to and received from a mobile station in accordance with the spreading code set as described above.

Figure 9:
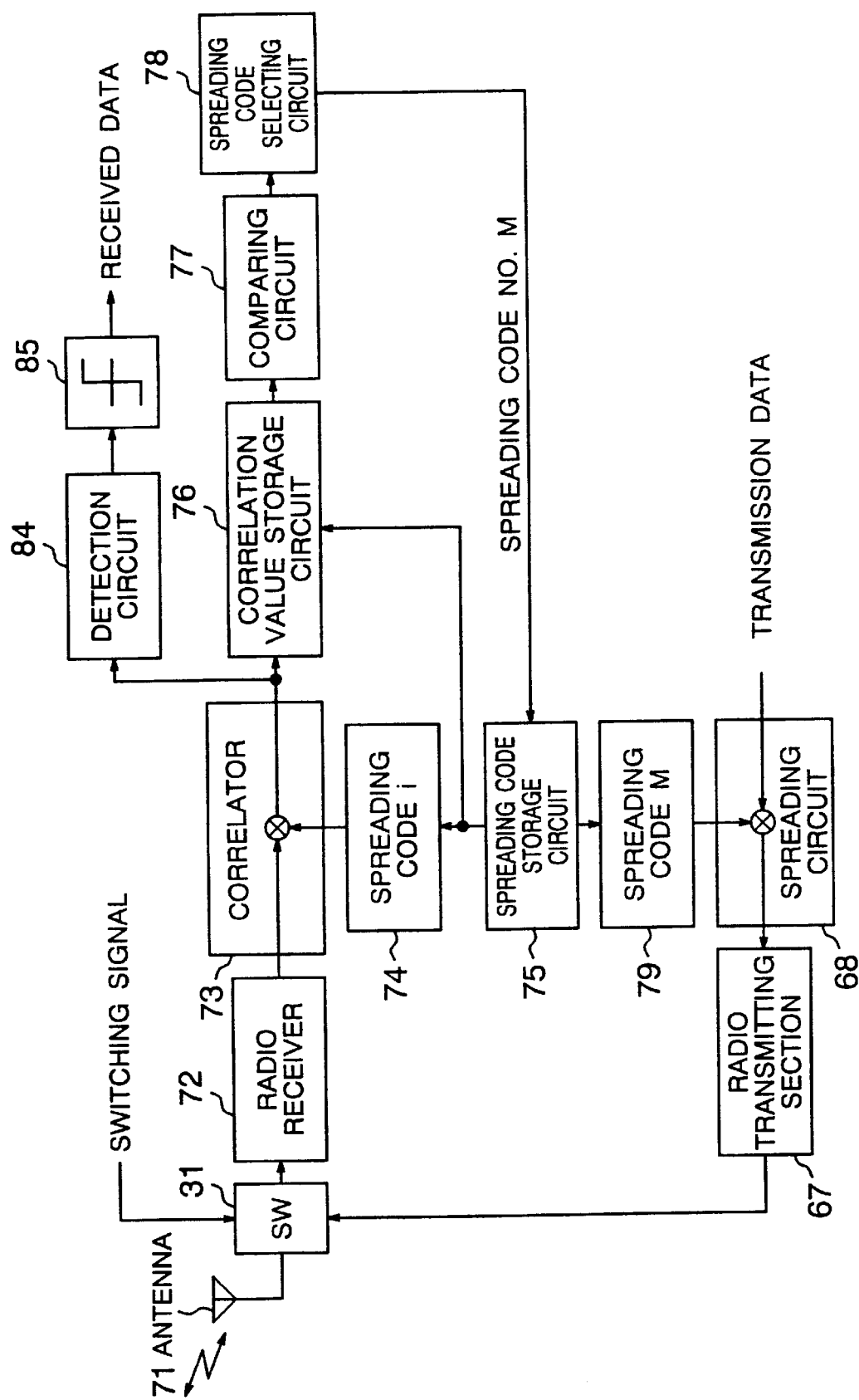
FIG. 9 is a block diagram showing the configuration of a CDMA base station facility in a sixth embodiment according to the present invention.
Figure 10:
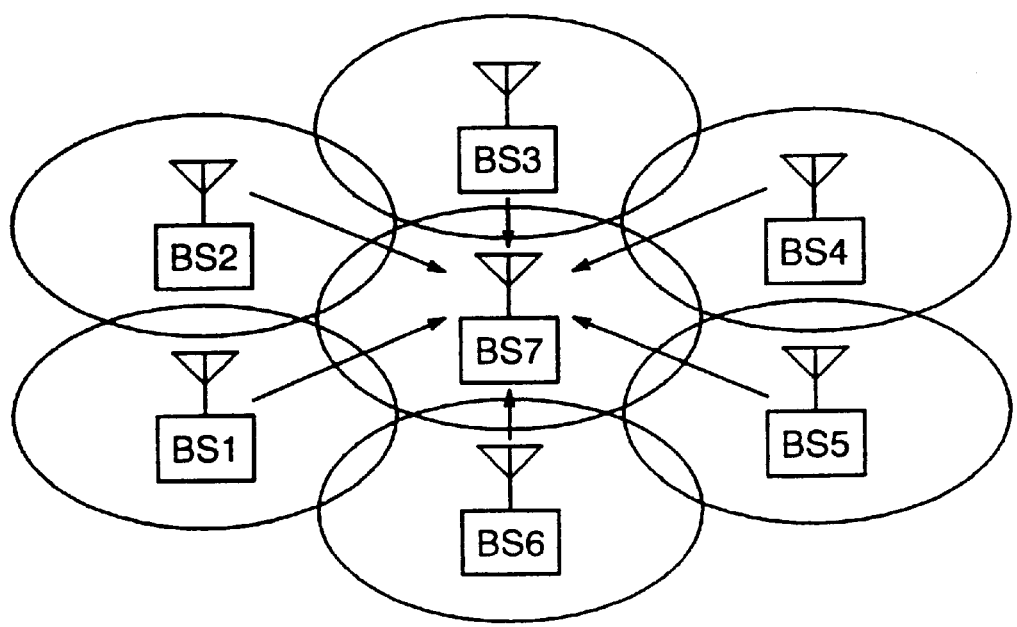
FIG. 10 is a diagram showing a layout of cells in a cellular mobile communication system.

As shown in FIG. 9, the facility includes a switch 88 for accomplishing a change-over operation between transmission and reception points of timing, a radio receiver 72 for down-converting the frequency of receiving signals of the frequency F3, a spreading code storage circuit 75 for storing therein all candidates of spreading codes available to the base stations of the system, a correlation circuit 83 for calculating correlation values between the received signals and a spreading code i 74 read from the storage circuit 75 or a spreading code M selected for the own station, a correlation value storage circuit 76 for storing therein magnitudes of correlation values calculated by the circuit 73, a comparing circuit 77 for comparing with each other the stored magnitudes of correlation values, a spreading code selecting circuit 78 for selecting a spreading code M in accordance with a result of the comparison, a detection circuit 84 for demodulating a received signal from a mobile station, a binary decision circuit 85 for conducting a binary decision for a result of the demodulation to decode the signals into received data, a spreading circuit 68 for spreading transmission data in accordance with the spreading code M 79, and a radio transmitting section 67 for up-converting the transmission signal into a signal having the frequency F3.

In an initial stage of installation, the base station facility conducts a change-over operation of the switch 81 to receive a signal on a transmission interval of a reserve link. Consequently, a signal sent from a neighboring base station is received via the antenna 71 to be inputted to the radio receiving circuit 72. The circuit 72 down-converts the frequency of the received signal of the frequency F3. A circuit group including the correlation circuit 73, the spreading code storage circuit 75, the correlation value storage circuit 76, the comparing circuit 77, and the spreading code selecting circuit 78 achieves an operation for the received signal as described in conjunction with the first embodiment to thereby select a spreading code assigned with a number M having a small magnitude of correlation value.

When the spreading code M is selected, the facility sends a switching signal to the switch 86 to conduct a change-over operation of points of timing such that a signal is received during a transmission interval of a forward link and a signal is sent during a transmission interval of a reverse link.

Transmission data is spread by the spreading circuit 68 in accordance with the selected spreading code M 79 to be up-converted by the radio transmitting section 67 into a signal having the frequency F3 of the reverse link and then the signal is sent via the switch 86 and the antenna 71 during the transmission interval of the reverse link.

On the other hand, the signal sent from the mobile station during a transmission interval of the forward link is inputted via the antenna 71 and the switch 86 to the receiving section 72, which then down-converts the frequency of the received signal. The correlation circuit 73 calculates a correlation value between the received signal and the selected spreading code M. The detection circuit 84 demodulates the received signal and the binary decision circuit 85 conducts a binary decision for a result of the demodulation to decode the signal into received data.

As described above, in the base station facility operating in the TDD method, the radio receiver and the correlation circuit can be used in a shared fashion when a spreading code is set to the own station and when a signal is communicated with a mobile station. Consequently, it is possible to simplify the facility.

(Seventh embodiment)

For the seventh embodiment, description will be given of a base station facility in a system in which respective base stations utilize a shared spreading code with mutually different phases.

The respective base stations of the system send and receive signals with synchronization established therebetween. Moreover, at transmission and reception of signals, the spreading codes for the identification of the respective stations are utilized with mutually different phases. Each base station is identified in accordance with the difference in phase.

The base station facility has a configuration similar to those of the base station facilities described in conjunction with the first to sixth embodiments, namely, the base station facilities of the systems in which the respective base stations are identified in accordance with kinds of spreading codes. However, in each embodiment, the spreading code storage circuit stores therein only the spreading codes used by the base stations of the system in a shared manner, the correlation value storage circuit stores therein relationships between the correlation values calculated by the correlation circuit and the phases of spreading codes, and the spreading code selecting circuit selects a phase of spreading code to be used by the own station.

Figure 12:
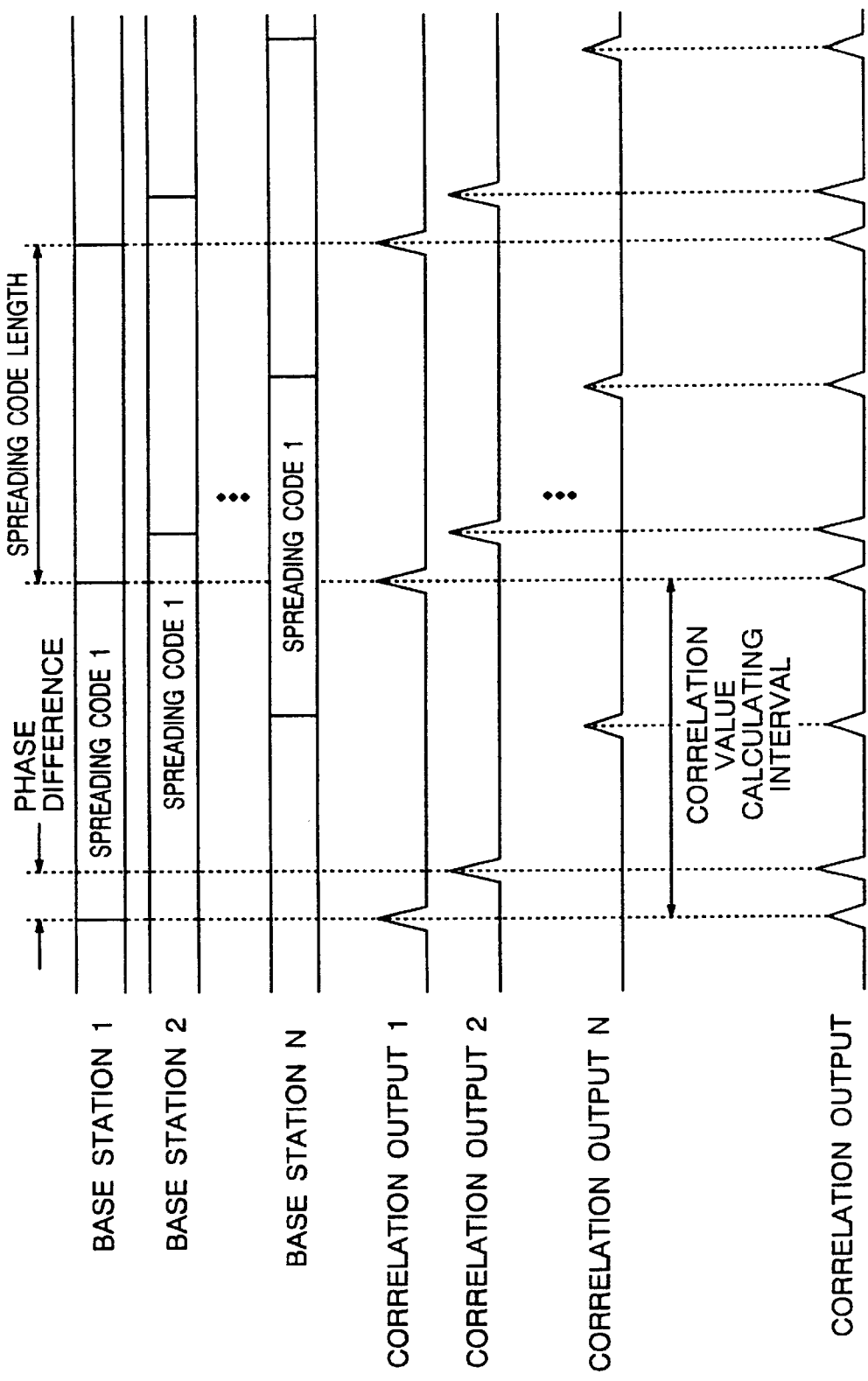
FIG. 12 a timing chart of the CDMA base station facility in a seventh embodiment to calculate correlation outputs according to the present invention.

FIG. 12 shows a timing chart in an operation of the base station facility of the system to calculate a correlation output in accordance with a transmission signal from a neighboring base station.

In a case in which neighboring base stations including base station 1, base station 2, and base station N transmit signals in accordance with a shared spreading code 1 with different phases, when a new base station receives the signals, there are respectively calculated correlation outputs 1, 2, and N in association with the base stations 1, 2, and N. Therefore, all of these correlation outputs are stored in the correlation value storage circuit of the new base station. The spreading code selecting circuit of the new base station selects a phase of which the correlation output in the correlation value calculating interval is zero such that a spreading code having the phase is utilized by the own station.

Figure 13:
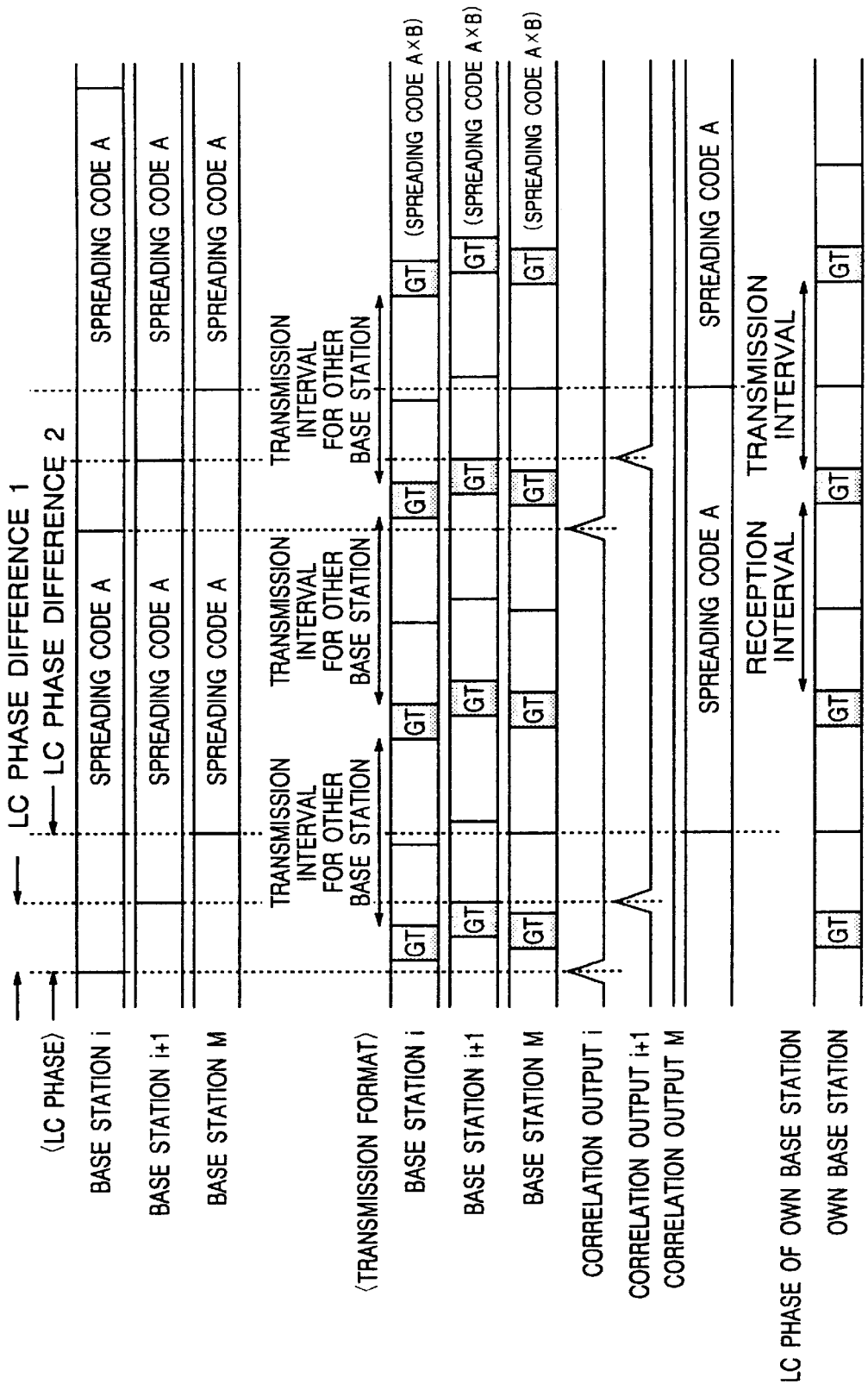
FIG. 13 is a timing chart of the CDMA base station facility of the seventh embodiment to set a phase of the own station.

FIG. 13 shows a timing chart in a case in which the respective base stations in the CDMA/TDD system establishing synchronization therebetween transmit and receive signals by using long codes (LCs) including a spreading code A, the stations utilizing mutually different phases.

Assume here that base stations i and i+1 use the spreading code A with an LC phase difference 1 therebetween, whereas base stations i and M utilize the spreading code A with an LC phase difference 2 therebetween.

The base stations i, i+1, and M establishing synchronization therebetween transmit signals in a transmission interval for other base station substantially at the same time and receive signals in a reception interval for other base station substantially at the same time. In the signal transmission and reception, a product between the long code A and a short code B is employed as a spreading code.

The new base station (own base station) calculates a correlation output i in association with the use of the spreading code a in the base station i and a correlation output i+1 in association with the use of the spreading code a in the base station i+1. However, since the base station M is apart from the own station, the correlation output corresponding to the use of the spreading code A in the base station M is assumed to be zero.

In accordance with the result of the calculation, the new base station sets, as the phase difference of the own station, the LC phase difference 2 with respect to the base station i for which the correlation output is zero. Using a long code related to the spreading code A of the phase difference, the base station receives a signal from a mobile station during a reception interval and transmits a signal to a mobile station during a transmission interval.

As discussed above, in a system in which the respective base stations adopt a shared spreading code with mutually different phases, the base station facility can autonomously determine a phase of spreading code for the identification of the own station.

As can be seen from the description above, the CDMA base station facility of the present invention can determine, at its new installation place, a spreading code or a phase of spreading code to be used by the own station. In consequence, the humanpower to design the installation of new base stations can be minimized. As a consequence, the additional installation of base stations is facilitated.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A CDMA (Code Division Multiple Access) base station facility for use with a cellular radio system in which each of base stations can be identified by one of plural a plurality of spreading codes employed in a respective one of the base stations, said CDMA base station facility comprising:

storage means for storing therein all candidates of the spreading codes available to the base stations in the system;

base station signal receiving means for receiving signals transmitted from neighboring base stations;

correlation value calculating means for calculating correlation values between the received signals from the neighboring base stations and the spreading codes stored in the storage means;

comparing means for comparing the calculated correlation values with each other; and spreading code selecting means for selecting a mode of using the spreading codes in the base station in accordance with a result of the comparison.

2. A CDMA base station facility in accordance with claim 1, wherein:

each of the base stations can be respectively identified by a kind of the spreading codes employed in the respective one of the base stations; and the spreading code selecting means selects a kind of the spreading codes to be employed by the pertinent station in accordance with a result of the comparison.

3. A CDMA base station facility in accordance with claim 1, wherein:

each of the base stations can be identified by using a spreading code which is common to the base stations and a phase of which varies between the base stations; and the spreading code selecting means selects a phase of spreading codes to be employed in the base station in accordance with a result of the comparison.

4. A CDMA base station facility in accordance with claim 1, wherein the base stations are synchronized with each other.

5. A CDMA base station facility in accordance with claim 2, wherein the base stations are synchronized with each other.

6. A CDMA base station facility in accordance with claim 3, wherein the base stations are synchronized with each other.

7. A CDMA base station facility in accordance with claim 2, further comprising:

spreading means for spreading a transmission signal in accordance with a spreading code selected by the spreading code selecting means; and transmitting means for transmitting the spread transmission signal.

8. A CDMA base station facility in accordance with claim 3, further comprising:

spreading means for spreading a transmission signal in accordance with a phase selected by the spreading code selecting means; and transmitting means for transmitting the spread transmission signal.

9. A CDMA base station facility in accordance with claim 2, further comprising:

mobile station signal receiving means for receiving a signal from a mobile station;

correlation value calculating means for calculating correlation values between the received signal from the mobile station and a spreading code selected by the spreading code selecting means; and demodulating means for demodulating received data in accordance with the calculated correlation value.

10. A CDMA base station facility in accordance with claim 4, further comprising:

mobile station signal receiving means for receiving a signal from a mobile station;

correlation value calculating means for calculating correlation values between the received signal from the mobile station and a spreading code selected by the spreading code selecting means; and demodulating means for demodulating received data in accordance with the calculated correlation value.

11. A CDMA base station facility in accordance with claim 7, further comprising:

mobile station signal receiving means for receiving a signal from a mobile station;

correlation value calculating means for calculating correlation values between the received signal from the mobile station and a spreading code selected by the spreading code selecting means; and demodulating means for demodulating received data in accordance with the calculated correlation value.

12. A CDMA base station facility in accordance with claim 3, further comprising:

mobile station signal receiving means for receiving a signal from a mobile station;

correlation value calculating means for calculating a correlation value between the received signal from the mobile station and a spreading code having a phase selected by the spreading code selecting means; and demodulating means for demodulating received data in accordance with the calculated correlation values.

13. A CDMA base station facility in accordance with claim 4, further comprising:

mobile station signal receiving means for receiving a signal from a mobile station;

correlation value calculating means for calculating a correlation value between the received signal from the mobile station and a spreading code having a phase selected by the spreading code selecting means; and demodulating means for demodulating received data in accordance with the calculated correlation values.

14. A CDMA base station facility in accordance with claim 8, further comprising:

mobile station signal receiving means for receiving a signal from a mobile station;

correlation value calculating means for calculating a correlation value between the received signal from the mobile station and a spreading code having a phase selected by the spreading code selecting means; and demodulating means for demodulating received data in accordance with the calculated correlation values.

15. A CDMA base station facility in accordance with claim 9, further comprising:

switching means for conducting a change-over operation of an output destination of the received signal between the base station signal receiving means and the mobile station signal receiving means.

16. A CDMA base station facility in accordance with claim 12, further comprising:

switching means for conducting a change-over operation of an output destination of the received signal between the base station signal receiving means and the mobile station signal receiving means.

17. A CDMA base station facility in accordance with claim 9, wherein:

the base station signal receiving means is utilized also for the mobile station signal receiving means;

the correlation value calculating means for calculating correlation values between the received signals from the neighboring base stations and the spreading codes is used also for the correlation value calculating means for calculating correlation values between the received signal from the neighboring base station and the spreading code, and the facility further comprising switching means for conducting a change-over operation of reception timing between a transmission interval of a reverse link and a transmission interval of an upward link.

18. A CDMA base station facility in accordance with claim 12, wherein:

the base station signal receiving means is utilized also for the mobile station signal receiving means;

the correlation value calculating means for calculating correlation values between the received signals from the neighboring base stations and the spreading codes is used also for the correlation value calculating means for calculating correlation values between the received signal from the neighboring base station and the spreading code, and the facility further comprises switching means for conducting a change-over operation of reception timing between a transmission interval of a reverse link and a transmission interval of an upward link.

19. A CDMA base station facility in accordance with claim 9, wherein the communication with the mobile station is conducted in a TDD (Time Division Duplex) method.

20. A CDMA base station facility in accordance with claim 9, wherein the communication with the mobile station is conducted in an FDD (Frequency Division Duplex) method.

* * * * *

UNITED STATES PATENT AND TRADEMARK OFFICE
CERTIFICATE OF CORRECTION

PATENT NO. : 6,128,288
DATED : October 3, 2000
INVENTOR(S) : Kazuyuki MIYA

It is certified that error appears in the above-identified patent and that said Letters Patent are hereby corrected as shown below:

Claim 1, line 2, after "of" insert --plural--; and line 3, after "by one of" delete "plural".

Signed and Sealed this

Fifteenth Day of May, 2001

Attest:

NICHOLAS P. GODICI

Attesting Officer

Acting Director of the United States Patent and Trademark Office